Aug. 4, 1925.

R. C. ANGELL 1,548,018

VALVE

Filed April 5, 1920

Witness
Elsie F. Jantzch.

Inventor
Robert C. Angell,
By Clifton C. Callowell
Attorney

Patented Aug. 4, 1925.

1,548,018

UNITED STATES PATENT OFFICE.

ROBERT C. ANGELL, OF BROOKLYN, NEW YORK, ASSIGNOR TO THE S. S. WHITE DENTAL MANUFACTURING COMPANY, A CORPORATION OF PENNSYLVANIA.

VALVE.

Application filed April 5, 1920. Serial No. 371,363.

*To all whom it may concern:*

Be it known that I, ROBERT C. ANGELL, a citizen of the United States, and a resident of Brooklyn, in the county of Kings, State of New York, have invented certain new and useful Improvements in Valves, of which the following is a specification, reference being had to the accompanying drawings.

My invention relates particularly to high pressure valves, and is especially directed to valves designed to be employed in connection with portable gas cylinders, such as are commonly used for carrying and dispensing nitrous oxid or oxygen gases for various uses.

In valves of the type contemplated, it has been difficult to prevent leakage of the gas around the valve-stem, particularly when closing the passageway leading from the cylinder outlet, as the axial movement of the valve-plug tends to effect a similar axial movement of the valve-stem by reason of their frictional engagement.

The principal object of my invention is to provide a valve with a stem having means that tends to prevent leakage when the plug is actuated to open or close the cylinder outlet.

Other objects of my invention are to provide a valve with a stem formed of sectional members which are of simple construction, readily assembled and replaced, and which are so constructed and arranged as to tend to elongate said stem when actuated to close said valve.

The form of my invention as hereinafter described, comprehends a valve having a threaded valve-plug actuated by a valve-stem through an interposed connecting shoe, which is axially movable with respect to both said valve-plug and valve-stem and which has inclined surfaces engaging similarly inclined surfaces on said stem, cooperative to effect the sealing of the aperture through which said valve-stem extends, by thrusting said valve-stem axially against its seat.

My invention also includes all of the various novel features of construction and arrangement as hereinafter more definitely specified.

Figure 1:
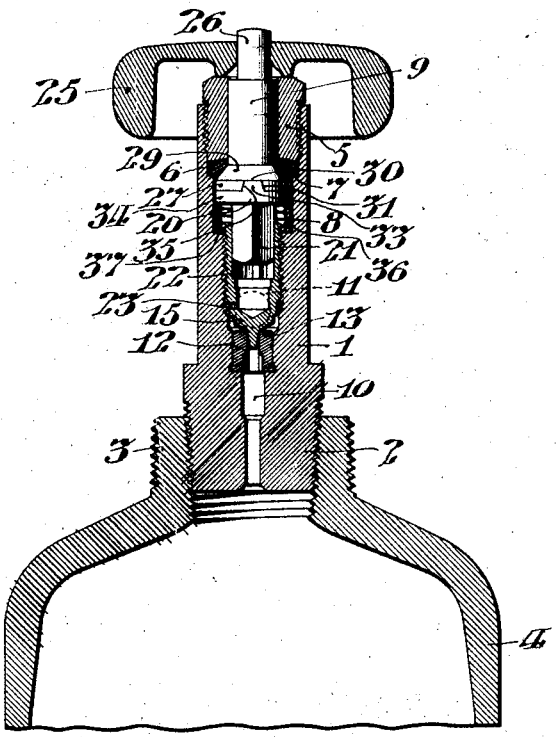
Figure 2:
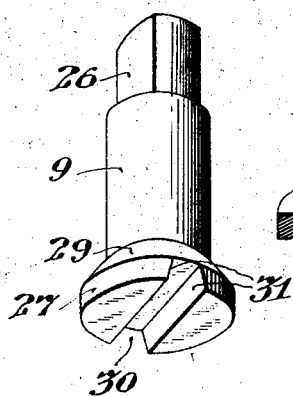
Figure 4:
Figure 3:
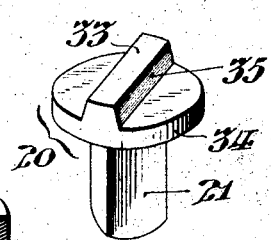

In the accompanying drawings, Figure 1 is a central vertical sectional view taken axially through a valve constructed in accordance with my invention as applied to a gas cylinder, certain of the parts being shown in elevation for convenience of illustration; Fig. 2 is a perspective view of the outer section of the valve-stem; Fig. 3 is a perspective view of the inner section or shoe of the valve-stem; and Fig. 4 is a sectional perspective view of the seat washer which cooperates with the valve-stem to seal the aperture through which said valve-stem extends.

In said figures, the valve-body 1 has its threaded nipple 2 engaged with the neck 3 of a gas cylinder 4, and is provided with the gland 5 in threaded engagement with the valve-body 1, arranged to compress the washer 6, preferably formed of rubber, against the shoulder 7 in the chamber 8 of said valve-body 1 to form a seat for the valve-stem 9.

The valve-body 1 is provided with a passageway 10, leading to the gas cylinder 4, and having the outlet 11 between which is interposed the valve-seat block 12, having the seat 13 for the valve-plug 15, which is in threaded engagement with the threaded walls of the chamber 8.

The valve-plug 15 is arranged to be rotated to open and close the passageway 10, by the valve-stem 9, which extends through a suitably formed aperture in the gland 5, and which includes the shoe 20, having the squared extension 21 projecting into a similarly squared recess 22 in said valve-plug 15. Pressure upon the valve-plug 15 may be equalized by providing said recess 22 with a duct 23 which is arranged to communicate with the passageway 10 when said valve-plug 15 is in its open position.

The valve-stem 9 may be conveniently rotated by the hand-wheel 25, which is removably engaged with the flattened projection 26 extending from said valve-stem beyond the gland 5. The valve-stem 9 is provided with the flange 27 disposed within the chamber 8, and has its conical outer surface 29 arranged to engage the seat formed by the washer 6. The inner surface of said flange 27 is provided with a diametrial groove 30, having its lateral walls 31 inclined with respect to each other, and to the axis of said stem, and is arranged to abut against the shoe 20, having the outer surface of its flange 34 provided with the spline 33 projecting into said groove 30, and having its lateral walls 35 similarly inclined, and so cooperatively related with the walls 31 as to effect the axial separation of said stem and its shoe when rotated under pressure to actuate the valve-plug 15; a spiral spring 36 being disposed in the bore 8 and bearing against the shoulder 37 and flange 34, tends to maintain the adjacent surfaces of said shoe and stem in intimate contact.

It will be obvious that when the valve-plug 15 is forced down onto its seat 13 by rotation of the valve-stem 9, the inclined surfaces comprising the lateral walls 31 and 35 on the valve-stem 9 and shoe 20 tend to slide upon each other in a direction parallel with the axis of rotation and thereby force the stem into intimate contact with the seat formed by the rubber washer 6, to seal the joint between said stem and gland, thus preventing leakage through the aperture through which said valve-stem extends.

Although I have described the valve-stem 9 as having the shoe 20 providing means forming an extension connecting the valve-stem with the valve-plug, it is to be understood that said shoe 20 is so correlated with said valve-stem 9 as to in effect form therewith a compound or sectional valve-stem which is capable of axial expansion or elongation.

It may be here noted that the tapered surfaces between the valve-stem 9 and shoe 20 may be variously modified to effect the result desired, for instance, conical pins and similarly shaped apertures may be readily substituted, and, therefore, I do not desire to limit my invention to the precise details of construction and arrangement as herein set forth, as it is obvious that various modifications may be made therein without departing from the essential features of my invention as defined in the appended claims.

Having thus described my invention, I claim:—

1. A valve comprising a valve-plug, and a sectional valve-stem arranged to actuate said valve-plug and having means effected by the rotation of said valve-stem tending to axially thrust one of said sections from the valve-plug.

2. A valve comprising a threaded valve-plug, and a sectional valve-stem arranged to rotate said valve-plug and having means cooperative therewith and effected by the rotation of said valve-stem, tending to axially thrust one of said sections from the valve-plug.

3. A valve comprising a body having a chamber, a threaded valve-plug in said chamber, and a sectional valve-stem arranged to rotate said valve-plug, said sections being rotatable one by the other, and having means arranged to axially separate said sections when the valve-stem is rotated, and means tending to axially thrust them from the valve-plug.

4. A valve comprising a body having a chamber, a threaded valve-plug in said chamber, and a sectional valve-stem arranged to rotate said valve-plug, said sections being rotatable, one by the other, and having means to axially separate the valve-stem sections when the valve stem is operated.

5. A valve comprising a body having a chamber, a threaded valve-plug in said chamber, and a sectional valve-stem arranged to rotate said valve-plug, said sections being rotatable, one by the other, and having cooperatively engaged inclined surfaces tending to axially thrust its sections apart when actuated to rotate said valve-plug.

6. A valve comprising a body having a chamber, a valve-plug in threaded engagement with the walls of said chamber, and a sectional valve-stem arranged to rotate said valve-plug, said sections being rotatable, one by the other, and respectively provided with a groove and a spline, having oppositely inclined walls cooperative with each other to effect the axial separation of said sections when actuated to rotate said valve-plug.

7. A valve comprising a body having a chamber, a valve-plug in threaded engagement with the walls of said chamber, a valve stem connected to said valve-plug for rotating said plug and having means cooperative therewith and with the connection between the valve-stem and plug tending to axially thrust the valve-stem from the valve-plug only when said plug is rotated, and a spring in said chamber tending to thrust said valve-stem away from said valve-plug.

8. A valve comprising a body having a chamber, a valve-plug in threaded engagement with the walls of said chamber, a valve-stem connected to said valve-plug for rotating said plug and having means cooperative therewith and with the connection between the valve-stem and plug tending to axially thrust the valve-stem from the valve-plug only when said plug is rotated, and yielding means tending to thrust said valve-stem axially away from said valve-plug.

9. A valve comprising a body having a chamber, a threaded valve-plug in said chamber, a sectional valve-stem rotatable as a whole to effect the rotation of said valve-plug and comprising an inner section and an outer section respectively having co-operatively inclined surfaces tending to separate said sections axially, when rotated under tension and having a longitudinally slidable connection with said plug.

In witness whereof, I have hereunto set my hand this 31st day of March, A. D., 1920.

ROBERT C. ANGELL.

Witnesses:
GEORGE H. BROWNE,
OLIVE M. HITCHCOCK.